Jan. 21, 1969 J. M. NUDING 3,422,529

METHOD OF MAKING A SUPERCONDUCTIVE JOINT

Filed Dec. 9, 1963

INVENTOR.
JAMES M. NUDING

BY Gerald A. Koris

ATTORNEY

United States Patent Office 3,422,529

Patented Jan. 21, 1969

3,422,529

METHOD OF MAKING A SUPERCONDUCTIVE JOINT

James M. Nuding, Canoga Park, Calif., assignor to North American Rockwell Corporation, a corporation of Delaware Filed Dec. 9, 1963, Ser. No. 329,311
U.S. Cl. 29—599 6 Claims
Int. Cl. H01s 4/00; H01r 43/04

Figure 1:
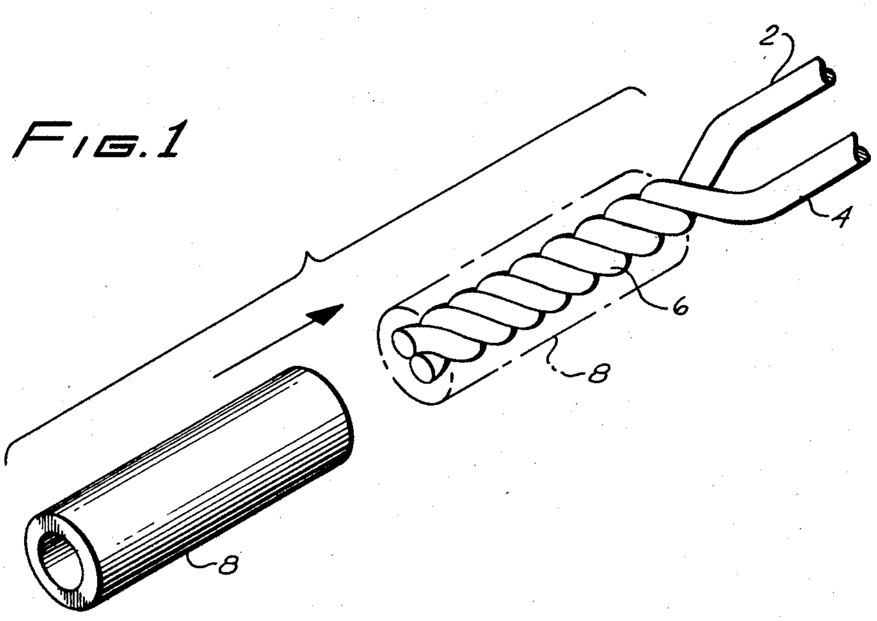

My invention relates to a method of making a junction between two pieces of superconducting wire, and more particularly to a method of making such a joint which will be superconductive.

Superconductivity is the property of certain materials at cryogenic temperatures approaching absolute zero to carry extremely large currents in strong magnetic fields without power dissipation. Such materials, at temperatures below a certain critical temperature, $T_c$, have no electrical resistivity, and therefore no $I^2R$ losses. This phenomenon has been experimentally verified. Coils of such materials in liquid helium baths, with currents induced by such means as withdrawing a permanent magnet from within the coil, have carried the resulting currents for periods of two years without any voltage drop. The factors affecting superconductivity of such materials are the interrelation of magnetic field strength H, critical current density $J_c$, and critical temperature $T_c$. The magnetic field strength, applied externally or generated by a current in the superconductor, limits superconductivity to below certain temperatures and current densities. Similarly, at a given field strength, an increase in temperature and/or current density can terminate superconductivity. The large current-carrying capacity of superconductors provides the basis for very compact, super-powerful magnets which can be used in numerous applications where strong magnetic fields are required, for example, in lasers, masers, accelerators, and bubble chambers.

Superconducting devices display the tendency, for reasons not thoroughly understood but believed to include application of excessive current or by local heating, to undergo a transition from the superconductive state to a normal conductive state, after which a superconductive condition can be reestablished. This transition, which is called an SN transition, causes large induced voltage drops to appear across the superconducting magnet when the strong fields collapse. Such voltage bursts may damage superconducting solenoids in addition to rendering them inoperative for short periods.

The tendency to undergo SN transitions is particularly pronounced at junctions between superconducting wires. Such junctions are frequently necessary in the fabrication of relatively large solenoids because of limitations on the length of superconducting wire which can be drawn in one section. It has been necessary to use wire ranging in lengths of from about 1,000 feet to 7,000 feet, due to difficulties in manufacturing longer lengths of the relatively brittle wire. Further, the cost of wire increases proportionately to an increase in length. Solenoids which require greater lengths of wire than heretofore obtainable have been constructed making joints between shorter lengths of wire. Such joints have been made by bringing the ends of wires to be joined outside of the solenoid but still in the coolant bath. Pressure-type connections are made with clamping screws on terminal strips or by soldering with such metals as copper-brass. This method of making connections is complicated and difficult, and such junctions are frequently non-superconducting or display a greater tendency to undergo SN transitions. The method is particularly disadvantageous for the fabrication of very large solenoids where several hundred thousand feet of wire are needed and many junctions would have to be made in a low flux region. Unless the entire solenoid is superconducting, a persistent flow of current will not be maintained after the power source is turned off, and hence the practical value of the solenoid is reduced.

An object of the present invention, accordingly, is to provide an improved method of joining sections of superconducting wire.

Another object is to provide a method of joining sections of superconducting wire, wherein the resulting joint is superconductive.

Another object is to provide a method of joining superconducting wire, wherein the junction will pass as much current as a solid piece of the same wire in a given magnetic flux field.

Still another object is to provide a junction between two pieces of superconducting wire which can be wound on a solenoid without displaying any greater tendency to undergo SN transitions than the parent metal.

The above and other objects and advantages of the present invention will become apparent from the following detailed description and the appended claims.

Figure 2:
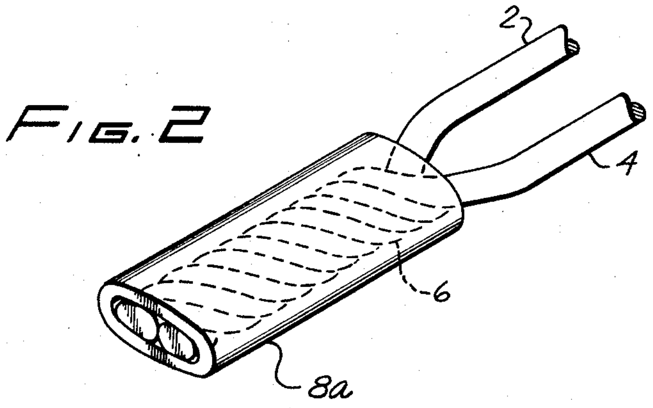

In the drawings, FIG. 1 is a schematic view of the joint components prior to assembly, and FIG. 2 is a schematic view of a completed joint.

In accordance with the present invention I have provided a method of making a superconductive joint between two sections of superconducting wire, which comprises twisting together ends of the wire, placing the resulting twisted section in a metal sleeve, and then cold pressing the resulting assembly.

The essential aspects of the present invention are illustrated in the drawing. In FIG. 1, two separate lengths of superconducting wire 2 and 4 are twisted together to form twisted section 6. The twisted end 6 is inserted in a metal sleeve 8 and the resulting assembly pressed at sufficient pressure to yield the final superconductive joint 8*a*. In addition to the embodiment shown where the superconducting wires are inserted into the cylinder from the same end, they may also be inserted from opposite ends.

The sleeve is pressed under sufficient pressure to bring about maximum contact between the twisted ends of the wire, which insures that the ends will not separate during thermal cycling, handling operations, or the like. The cold pressing also allows the metal of the cylinder to cold flow around the twists of wire until maximum contact is made between the twist, and between the twist and the cylinder. Joints made in this manner are superconductive, will pass large currents in kilogauss magnetic fields, may be wound directly onto solenoids, and will pass as much current as a single length of the same wire without sustaining SN transitions.

Experiments have shown that joints prepared under identical conditions, but without the twists, with the wires lying parallel to each other, are either non-superconducting or undergo SN transitions at relatively low current values. It is believed that this results from slight separations of the wires, which permits flow of sleeve metal therebetween, or from other conditions resulting in non-superconducting transition sections.

The two ends of the superconducting wire to be joined are first twisted together. The ends are generally even to each other, and the number of turns may vary while achieving a satisfactory joint. It is found, however, that the joint should have at least about three turns, placed about 1/16 inch apart. For example, when 10-mil wires are joined in a cylinder 3/16 inch long, the twisted length inserted into the cylinder has at least three and preferably about four turns. The number of turns per unit length of wire will depend upon the thickness and physical properties of the alloy wires; too many turns of a relatively thin, brittle wire may cause it to break. For example, six or more turns of 10-mil Nb-25 Zr alloy wire over a 3⁄16 inch length may cause fracture.

The twisted wire pair is then cleaned and inserted into the sleeve. The cleaning solution removes any oxide or organic film on the surface of the wire which might prevent complete contacting and formation of a superconductive joint. The common cleaning or pickling solutions known to the art may be used, such as a solution containing about 48 percent nitric acid, 2 percent hydrofluoric acid, and 50 percent water.

The cylinder or sleeve into which the twisted wire is inserted may be of either the same alloy as the superconducting wire or of stainless steel. The wall diameter of the cylinder should be such that it has adequate strength to maintain the wires under the compressive load imparted during cold pressing without fracturing. The axial hole through the cylinder need be of sufficient diameter only to permit ready insertion of the twisted wire. For example, for joining 10-mil wire, the cylinder may satisfactorily be 3⁄16" long by 1⁄16" O.D. with an axial hole 0.025" in diameter. The jacket metal may satisfactorily be of the same metal as the superconducting wire. However, since such metals are relatively brittle, any other nonmagnetic metal, such as stainless steel, having a tensile strength at least equal to that of the wire may be used as the sleeve material. Metals having higher ductility and lower tensile strength than the superconducting wire will cold flow axially and cause fracture of the wire, and may therefore not be used. The cylinder is cleaned in the same manner as the twisted wire prior to insertion of the pair therein.

The small cylinder is then slipped over the twisted pair so that two or three twists are inside the cylinder, and the assembly squeezed in a hydraulic press at a pressure sufficient to bring about maximum contact between the twists and between the twists and the cylinder. While the pressure applied to the assembly may satisfactorily vary, a pressure approaching the tensile strength of the superconducting wire is found to produce superior results and is, therefore, preferred. For example, in joining Nb-25 weight percent Zr alloy, which has a tensile strength of about 200,000 p.s.i., cold pressing at a pressure of about 170,000–200,000 p.s.i. is optimum. The pressure is maintained for a period sufficient to permit the cold flow previously mentioned. This is in the order of several minutes, and a period of about fifteen minutes is generally allowed for the pressing of the Nb-25 weight percent Zr wire at the before-indicated pressure. It is also found, however, that pressure on the joint in excess of the tensile strength of the wire has a deleterious effect and produces an inferior joint due to fracture of the wire. Accordingly, the pressing is preferably conducted at a pressure approaching but not exceeding the tensile strength of the wire.

The following example is offered to illustrate my invention in greater detail.

A junction between two pieces of 10-mil Nb-25% Zr superconducting wire was made by joining the two ends of the superconducting wire with the ends even each other, and twisting them together with four twists over a length of 3⁄16 inch. The twisted wire was cleaned in a solution of 48% nitric acid, 2% hydrofluoric acid, and 50% water. A small rod of the same alloy was machined into a cylinder 3⁄16" long by 1⁄16" O.D. with an axial hole 0.025" in diameter, and was cleaned with the same cleaning solution. The sleeve was slipped over the twisted pair so that about three twists were inside the sleeve. The assembly was squeezed in a hydraulic press to a pressure of about 200,000 p.s.i. and allowed to remain under such pressure for about 15 minutes.

The resulting joint was tested in a 30,000 gauss magnetic field at liquid helium temperature; it passed more than 100 amperes without sustaining an SN transition. For comparison purposes, identical wires lying parallel to each other were pressed in the same cylinders under the same conditions. In tests under the foregoing conditions, SN transitions resulted at currents ranging from 5 amps to 25 amps.

The foregoing example is offered for purposes of illustration rather than restriction. Variations may be made by those skilled in the art without departing from the spirit of the present invention.

I claim:

1. A method of forming a superconductive joint between pieces of superconductive wire, which comprises twisting the ends of said wire together, inserting the resulting twisted pair into a small metal sleeve, and cold pressing the resulting assembly at a pressure approximately equal to the tensile strength of both the sleeve and superconductive wires until firm contact is made between the twists of wire and the sleeve.

2. The method of claim 1, wherein the metal sleeve is nonmagnetic.

3. The method of claim 1, wherein the sleeve is made from a metal selected from the class consisting of stainless steel and the same metal as the superconductive wire.

4. A method of joining two pieces of niobium-zirconium alloy superconductive wire, which comprises twisting the ends of the wire together, positioning a small nonmagnetic metal cylinder having a tensile strength at least equal to said alloy over the twisted pair so that a plurality of twists remain inside the sleeve, cold pressing the resulting assembly at a pressure of about 170,000–200,000 p.s.i. until firm contact is made between the twists and the sleeve.

5. The method of claim 4 wherein said alloy consists essentially of about 25 weight percent zirconium and the remainder niobium, and a pressure of about 200,000 p.s.i. is applied for a period of about 15 minutes.

6. A method of making a superconductive junction between two lengths of fine niobium-zirconium wire, which comprises twisting the two ends of the wire together with at least three turns spaced about 1⁄16 inch apart, cleaning the resulting twisted pair, providing a small stainless steel cylinder with an axial hole sized to receive the twisted pair, cleaning said cylinder, inserting the wire into the cleaned cylinder so that the twists are positioned inside the cylinder, cold pressing the resulting assembly at a pressure of about 170,000–200,000 p.s.i. until complete contact is made between the turns of the twist and between the twists and the cylinder.

References Cited

UNITED STATES PATENTS

| | | | |
|---|---|---|---|
| 584,299 | 6/1897 | Weldon | 174—87 X |
| 3,200,368 | 8/1965 | Stekly et al. | |

CHARLIE T. MOON, *Primary Examiner.*

U.S. Cl. X.R.

29—518, 628; 174—87